US012762902B2

(12) United States Patent
Karuppaswamy et al.

(10) Patent No.: US 12,762,902 B2
(45) Date of Patent: Oct. 13, 2026

(54) SMART VEHICLE SYSTEMS AND CONTROL LOGIC FOR VALID AIRBAG DETECTION AND AUTHENTICATION

(71) Applicant: GM GLOBAL TECHNOLOGY OPERATIONS LLC, Detroit, MI (US)

(72) Inventors: Senthil Karuppaswamy, Rochester Hills, MI (US); Donald K. Grimm, Utica, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 19/043,783

(22) Filed: Feb. 3, 2025

(65) Prior Publication Data

US 2026/0229067 A1 Aug. 6, 2026

(51) Int. Cl.

*G07C 5/00* (2006.01)
*B60K 28/10* (2006.01)
*G07C 5/08* (2006.01)
*B60R 21/01* (2006.01)

(52) U.S. Cl.

CPC .............. *G07C 5/006* (2013.01); *B60K 28/10* (2013.01); *G07C 5/008* (2013.01); *G07C 5/0825* (2013.01); *G07C 5/0833* (2013.01); *B60R 21/01* (2013.01); *B60R 2021/01088* (2013.01); *B60R 2021/0119* (2013.01)

(58) Field of Classification Search

CPC ...... G07C 5/006; G07C 5/008; G07C 5/0825; G07C 5/0833; B60K 28/10; B60R 21/01; B60R 2021/01088; B60R 2021/0119

USPC ........................................................ 701/29.2

See application file for complete search history.

(56) References Cited

U.S. PATENT DOCUMENTS

| | | | |
|---|---|---|---|
| 7,594,674 | B1 | 9/2009 | Biondo |
| 7,641,223 | B2 | 1/2010 | Knowlden |
| 7,810,837 | B2 | 10/2010 | Thomas |
| 7,823,916 | B2 | 11/2010 | Piotrowski |
| 7,862,081 | B2 | 1/2011 | Thomas |
| 7,905,514 | B2 | 3/2011 | Thomas |

(Continued)

FOREIGN PATENT DOCUMENTS

| | | | | |
|---|---|---|---|---|
| DE | 102016218874 A1 | 1/2020 | |
| DE | 102018125443 A1 * | 4/2020 | ............. B60R 21/16 |
| WO | WO-9640538 A1 * | 12/1996 | ............. B60R 21/16 |

*Primary Examiner* — Isaac G Smith

(74) *Attorney, Agent, or Firm* — Quinn IP Law

(57) ABSTRACT

Presented are smart vehicle systems for valid airbag detection and authentication, methods for making/using such smart vehicle systems, and motor vehicles equipped with such systems. A method of operating a host vehicle includes a near-field communication (NFC) transceiver attached to the host vehicle's body detecting installation of a supplemental inflatable restraint (SIR) module in the vehicle's passenger cabin. Responsive to detecting the SIR module, the NFC transceiver pairs with an NFC tag mounted to the SIR module and a vehicle controller retrieves unique SIR module data specific to the SIR module from the paired NFC tag. The unique SIR module data is compared to unique SIR data specific to the host vehicle to determine if the SIR module is invalid. Responsive to the SIR module being invalid, the vehicle controller commands a resident vehicle subsystem to execute a remediating action to prevent or mitigate activation of the invalid SIR module.

20 Claims, 3 Drawing Sheets

(56) References Cited

U.S. PATENT DOCUMENTS

| | | | | |
|---|---|---|---|---|
| 7,909,361 | B2 | 3/2011 | Oblizajek | |
| 8,292,322 | B2 | 10/2012 | Thomas | |
| 2007/0073944 | A1 * | 3/2007 | Gormley | B60R 16/0231 710/72 |
| 2008/0147265 | A1 * | 6/2008 | Breed | G07C 5/0808 701/424 |
| 2016/0052481 | A1 * | 2/2016 | Yamauchi | B60R 21/2644 102/530 |
| 2018/0123645 | A1 | 5/2018 | Jang | |
| 2019/0265966 | A1 * | 8/2019 | Shimomura | B60R 16/023 |
| 2020/0353886 | A1 * | 11/2020 | Robertson | B60R 21/01542 |
| 2020/0358480 | A1 | 11/2020 | Pickering et al. | |
| 2021/0099027 | A1 * | 4/2021 | Larsson | H02J 50/90 |

* cited by examiner

SMART VEHICLE SYSTEMS AND CONTROL LOGIC FOR VALID AIRBAG DETECTION AND AUTHENTICATION

INTRODUCTION

The present disclosure relates generally to occupant restraint systems for motor vehicles. More specifically, aspects of this disclosure relate to systems and methods for authenticating airbags installed in automobiles.

Current production motor vehicles, such as the modern-day automobile, are originally equipped with an occupant restraint system for limiting the inadvertent movement of a driver or passenger that may result from an abrupt vehicle stop, vehicle inversion, or unexpected contact with a foreign object. In automotive applications, for example, the most recognizable type of occupant restraint system is the passenger seatbelt assembly. Most vehicle seatbelt assemblies are strap-and-latch type chest harnesses designed to retain vehicle occupants in their seat and provide controlled deceleration of the occupant to limit the application of external forces to the occupant's body during rapid deceleration. A "pretensioner" unit may be integrated into the seatbelt assembly to actively tighten the seatbelt strap about the vehicle occupant in the event of a sensed triggering condition. The pretensioner unit operates to rapidly draw in a length of webbing in order to take up any slack that may have developed between the occupant and belt.

Many automobiles—as part of the overall occupant restraint system—employ an assortment of supplemental inflatable restraints (SIR) throughout the passenger cabin, including inflatable airbags that attenuate occupant kinetic energy and reduce involuntary occupant contact with interior structures of the vehicle. A standard airbag device includes an inflatable airbag module that is mounted to a steering wheel hub (e.g., for driver-side airbags), behind a vehicle instrument panel (e.g., for passenger-side airbags), or inside a vehicle seat assembly, side door trim, or headliner trim (e.g., for side-force airbags). A distributed array of dynamic sensors is strategically located throughout the vehicle body to detect the onset of any one of multiple predefined SIR triggering events. A resident sensing and diagnostics module (SDM) responsively activates a pyrotechnic inflation device that is internally located in the airbag module; this produces a flow of inflating gas into an inflatable airbag cushion that is also packaged inside the module. The inflating gas causes the airbag cushion to deploy into the vehicle passenger cabin and toward an occupant.

SUMMARY

Presented herein are smart vehicle systems with attendant control logic for valid airbag detection and authentication, methods for manufacturing and methods for operating such smart vehicle systems, and motor vehicles equipped with such systems. By way of example, a near-field communication (NFC) enabled airbag monitoring system uses a wireless NFC transceiver to communicate with an NFC tag packaged within an airbag module to verify the module's authenticity (e.g., manufacturer-approved airbag module). Other radio technologies, such as passive RFID or UWB tags, may also be utilized, provided they incorporate adequate security measures. For the purposes of this patent application, the term 'NFC' is defined broadly to encompass any family of technologies that enable short-range, contactless, and passive communications. To enable two-factor authentication, for example, an airbag equipment supplier installs an individualized and traceable NFC tag on the airbag inflator assembly of a driver supplemental inflatable restraint (DSIR) unit. If the airbag is deemed invalid, the system may automate one or more remediating actions, including outputting a visual, audible, and/or haptic alert to a vehicle occupant, transmitting an electronic notification to the owner or driver, setting a diagnostic trouble code (DTC), disabling the airbag, restricting vehicle speed, limiting vehicle use, or other appropriate action.

Valid NFC tag identification (ID) information for each module may be registered in a central database of the original equipment manufacturer (OEM) and may be married to a host vehicle's sensing and diagnostics module (SDM) unit during assembly. After the DSIR is installed into the host vehicle, the vehicle's SDM unit pairs with an NFC tag installed on the DSIR's inflater to extract, for example, a serial number and a part number. This information may be cross-referenced with the host vehicle's unique Vehicle Identification Number (VIN) and assigned SIR data that is stored on an OEM's centralized database to authenticate the unit. The smart vehicle system may leverage the host vehicle's NFC-based keyless entry system architecture to execute device-to-device communications. In addition to a DSIR unit, disclosed airbag validation solutions may be used for other in-vehicle SIR units, including front passenger-side airbags, rear airbags, side-impact airbags, side curtain airbags, knee bolster airbags, etc.

If the airbag inflator is deployed by the SDM, the NFC-tag may be designed to incinerate from the resultant inflator heat to prevent theft and illicit reuse of the tag on a replica module. When a new airbag module is installed, the associated NFC tag data of the new unit is retrieved by the SDM and authenticated against records kept by the OEM database. Each airbag module and its associated host vehicle may be tracked in real-time by the OEM; if there is a vehicle recall, the airbag unit may be remotely disabled until the recalled unit is replaced. If an invalid airbag module or an OEM airbag module from a different vehicle is installed in a host vehicle, the NFC tag data will not match the corresponding vehicle SIR data in the OEM database. In this case, the invalid module may be flagged by the SDM and OEM, and a warning may be sent to the vehicle owner/driver that an invalid airbag might be installed in their vehicle. Upon detection of an invalid airbag module, the host vehicle may take multiple mitigating actions, including illuminating a warning light, outputting an audible or haptic alert (e.g., via seat mounted haptic transducer 84), reducing a maximum allowable vehicle speed, and/or disabling the airbag unit until the issue is resolved.

Aspects of this disclosure are directed to methods for making and methods for using any of the herein described motor vehicles and/or smart vehicle systems. In an example, a method is presented for operating a host vehicle, which includes a vehicle body with a passenger cabin. This representative method includes, in any order and in any combination with any of the above and below disclosed options and features: detecting, e.g., via an NFC transceiver (e.g., NFC ISO 14443-A or B reader) attached to the host vehicle's body, installation of a supplemental inflatable restraint module in the passenger cabin; pairing, e.g., responsive to detecting the installed SIR module, the NFC transceiver with an NFC tag (e.g., NTAG215 Type 1 or 2 NFC tag) mounted to the SIR module; retrieving, e.g., through the NFC transceiver from the paired NFC tag by a resident or remote microprocessor, central controller, programmable logic device, control module, or network of controllers/ processors/modules/devices/etc. (collectively "vehicle controller"), unique SIR module data specific to the SIR module (e.g., serial number, part number, make and model, etc.); determining if the SIR module is invalid by comparing the unique SIR module data to unique vehicle/SIR data specific to the host vehicle (e.g., list of SIR serial numbers assigned to vehicle VIN in OEM database or resident vehicle memory); and commanding, e.g., via the vehicle controller responsive to determining the SIR module is invalid, one or more resident vehicle subsystems to execute one or more remediating actions to prevent or mitigate activation of the invalid SIR module.

Aspects of this disclosure are also directed to computer-readable media (CRM) containing controller-executable instructions for provisioning invalid airbag detection and mitigation. In an example, a non-transient CRM stores instructions that are executable by a vehicle controller of a host vehicle. These CRM-stored instructions, when executed, cause the vehicle controller to perform operations that include: detecting, using an NFC transceiver attached to the host vehicle body, installation of a supplemental inflatable restraint module on the host vehicle, the NFC transceiver pairing with an NFC tag mounted to the SIR module in response to detecting installation of the SIR module; retrieving, through the NFC transceiver from the paired NFC tag, unique SIR module data specific to the SIR module; determining if the SIR module is invalid by comparing the unique SIR module data to host vehicle SIR data specific to the host vehicle; and commanding, via the vehicle controller responsive to determining the SIR module is invalid, a resident vehicle subsystem to execute a remediating action configured to prevent or mitigate activation of the invalid SIR module.

Additional aspects of this disclosure are directed to motor vehicles equipped with airbag monitoring systems for detecting and remediating invalid airbags. As used herein, the terms "vehicle" and "motor vehicle" may be used interchangeably and synonymously to include any relevant vehicle platform, such as passenger vehicles, commercial vehicles, industrial vehicles, off-road and all-terrain vehicles, tracked vehicles, farm equipment, motorcycles, watercraft, aircraft, spacecraft, etc. In an example, a motor vehicle includes a vehicle body with a passenger cabin, multiple road wheels attached to the vehicle body (e.g., via corner modules coupled to a unibody or body-on-frame chassis), and other standard original equipment. A prime mover, which may be in the nature of an electric traction motor and/or an internal combustion engine (ICE) assembly, is located inside the vehicle body and drives the road wheel(s) to propel the vehicle. The vehicle is also equipped with a supplemental inflatable restraint system with a networked array of SIR modules mounted inside the passenger cabin and a resident NFC transceiver that wirelessly communicates with the SIR system modules.

Continuing with the discussion of the foregoing example, the vehicle is also equipped with a resident or remote vehicle controller that is programmed to detect each SIR module installed in the passenger cabin using the vehicle's resident NFC transceiver. When an installed SIR module is detected, the NFC transceiver pairs with an NFC tag mounted to that SIR module. The vehicle controller then accesses the paired NFC tag through the NFC transceiver to retrieve therefrom unique module data specific to the installed SIR module. The controller then compares the SIR module's unique data to memory-stored vehicle/SIR data specific to the motor vehicle to determine if the SIR module is invalid. If it is, the vehicle controller responsively command one or more resident vehicle subsystems to execute one or more remediating actions that will help to prevent or mitigate activation of the invalid SIR module.

For any of the disclosed vehicles, systems, and methods, the vehicle controller may receive a deployment notification, e.g., from the SDM, indicating that the SIR module was activated. After receipt of the deployment notification, the NFC transceiver detects installation of a replacement SIR module in the host vehicle's passenger cabin and, once detected, the NFC transceiver pairs with a new NFC tag that is mounted to the replacement SIR module. The vehicle controller accesses the newly paired NFC tag to retrieve therefrom module-specific data that is unique to the replacement SIR module and compares this unique module data to the host's vehicle/SIR data to determine if the replacement SIR module is invalid. If it is, the vehicle controller may responsively execute any of the herein described remediating measures. Upon determining that an installed SIR module is valid (e.g., authentic and assigned to the host vehicle), the vehicle's SDM may responsively enable activation of that SIR module.

For any of the disclosed vehicles, systems, and methods, detecting installation of a SIR module may include the NFC transceiver broadcasting a short-range electromagnetic field (EMF); once in range, the NFC tag receives and is powered on by the electromagnetic field. Pairing the NFC transceiver with the NFC tag may include the NFC tag outputting a handshake request to the NFC transceiver and, if approved, establishing a secure device-to-device communication channel across the electromagnetic field between the NFC tag and NFC transceiver. As a further option, it may be desirable that the NFC tag be mounted onto an airbag inflator assembly that is packaged inside a protective module housing of the SIR module. In this instance, the NFC tag may be fabricated with an NFC chip and an EMF antenna that are mounted onto an NFC substrate, which is designed to incinerate at a temperature of the heat generated by the airbag inflator.

For any of the disclosed vehicles, systems, and methods, the vehicle controller may transmit the SIR module's unique data to a remote back-office (BO) vehicle services provider, e.g., via a long-range wireless communications interface. The BO vehicle services provider then determines if the SIR module is invalid by retrieving the host vehicle/SIR data from a SIR ID database, comparing the SIR module's unique data to the host vehicle's respective SIR data, and wirelessly transmitting an invalid SIR module alert to the vehicle controller if the SIR is determined to be invalid. As another option, the vehicle controller may retrieve the host vehicle's assigned SIR data from a resident memory device of the host vehicle, and may determine whether or not the SIR module is a non-OEM replica and/or not assigned to the host and, thus, is invalid.

For any of the disclosed vehicles, systems, and methods, the resident vehicle subsystem may include the host vehicle's resident SDM that is operable to control activation of each SIR module. In this instance, the remediating action may include the SIR module disabling activation of the invalid SIR module. As another option, the resident vehicle subsystem may include a powertrain control module (PCM) that is operable to control operation of the host vehicle's powertrain. In this instance, the remediating action may include the PCM reducing a maximum allowable speed of the host vehicle. As yet another option, the resident vehicle subsystem may include an infotainment system with a telematics unit and/or a digital instrument cluster mounted inside the host vehicle's passenger cabin. In this example, the remediating action may include the infotainment system outputting a predefined audible alert and/or a predefined visual alert of an invalid SIR module to an occupant of the host vehicle.

Additional features and options may be found in the following clauses:

Clause 1: a method of operating a host vehicle with a host vehicle body defining therein a passenger cabin, the method comprising: detecting, via a near-field communication (NFC) transceiver attached to the host vehicle body, installation of a supplemental inflatable restraint (SIR) module in the passenger cabin; pairing, responsive to detecting installation of the SIR module, the NFC transceiver with an NFC tag mounted to the SIR module; retrieving, through the NFC transceiver from the paired NFC tag via a vehicle controller attached to the host vehicle body, unique SIR module data specific to the SIR module; determining if the SIR module is invalid by comparing the unique SIR module data to host vehicle SIR data specific to the host vehicle; and commanding, via the vehicle controller responsive to determining the SIR module is invalid, a resident vehicle subsystem to execute a remediating action configured to prevent or mitigate activation of the invalid SIR module.

Clause 2: the method of clause 1, further comprising: receiving, via the vehicle controller, a deployment notification indicating the SIR module was activated; detecting, via the NFC transceiver after receipt of the deployment notification, installation of a replacement SIR module in the passenger cabin; and pairing, responsive to detecting installation of the replacement SIR module, the NFC transceiver with a new NFC tag mounted to the replacement SIR module.

Clause 3: the method of clause 2, further comprising: retrieving, via the vehicle controller through the NFC transceiver, new unique SIR module data specific to the replacement SIR module; determining if the replacement SIR module is invalid by comparing the new unique SIR module data to the host vehicle SIR data specific to the host vehicle; and commanding, via the vehicle controller responsive to determining the replacement SIR module is invalid, the resident vehicle subsystem to execute the remediating action to prevent or mitigate activation of the invalid replacement SIR module.

Clause 4: the method of clause 1, wherein detecting the installation of the SIR module includes the NFC transceiver broadcasting a short-range electromagnetic field to the NFC tag, and the NFC tag powering on in response to receipt of the short-range electromagnetic field.

Clause 5: the method of clause 4, wherein pairing the NFC transceiver with the NFC tag includes establishing a secure device-to-device communication channel across the short-range electromagnetic field between the NFC tag and the NFC transceiver.

Clause 6: the method of clause 1, wherein the resident vehicle subsystem includes a sensing and diagnostics module (SDM) operable to control activation of the SIR module, the method further comprising commanding, via the vehicle controller responsive to determining the SIR module is not invalid, the SDM to enable activation of the SIR module.

Clause 7: the method of clause 1, further comprising mounting the NFC tag onto an airbag inflator assembly inside a protective module housing of the SIR module.

Clause 8: the method of clause 7, further comprising manufacturing the NFC tag with an NFC chip and an electromagnetic field (EMF) antenna on an NFC substrate configured to incinerate at a temperature of heat generated by the airbag inflator assembly.

Clause 9: the method of clause 1, further comprising transmitting, via the vehicle controller, the unique SIR module data to a back-office (BO) vehicle services provider, wherein determining the SIR module is invalid includes the BO vehicle services provider retrieving the host vehicle SIR data from a SIR ID database, comparing the unique SIR module data to the host vehicle SIR data, and wirelessly transmitting an invalid SIR module alert to the vehicle controller.

Clause 10: the method of clause 1, further comprising retrieving, via the vehicle controller, the host vehicle SIR data from a resident memory device of the host vehicle, wherein the vehicle controller determines whether or not the SIR module is invalid.

Clause 11: the method of clause 1, wherein the resident vehicle subsystem includes a sensing and diagnostics module (SDM) operable to control activation of the SIR module, and the remediating action includes the SIR module disabling activation of the SIR module.

Clause 12: the method of clause 1, wherein the resident vehicle subsystem includes a powertrain control module (PCM) operable to control a powertrain of the host vehicle, and the remediating action includes the PCM reducing a maximum allowable speed of the host vehicle.

Clause 13: the method of clause 1, wherein the resident vehicle subsystem includes an infotainment system with a telematics unit and/or a digital instrument cluster mounted inside the passenger cabin, and the remediating action includes the infotainment system outputting a predefined audible and/or visual alert of an invalid SIR module to an occupant of the host vehicle.

Clause 14: a non-transient, computer-readable medium storing instructions executable by a vehicle controller of a host vehicle, the host vehicle including a host vehicle body, the instructions, when executed, causing the vehicle controller to perform operations comprising: detecting, using a near-field communication (NFC) transceiver attached to the host vehicle body, installation of a supplemental inflatable restraint (SIR) module on the host vehicle, the NFC transceiver pairing with an NFC tag mounted to the SIR module in response to detecting installation of the SIR module; retrieving, through the NFC transceiver from the paired NFC tag, unique SIR module data specific to the SIR module; determining if the SIR module is invalid by comparing the unique SIR module data to host vehicle SIR data specific to the host vehicle; and commanding, via the vehicle controller responsive to determining the SIR module is invalid, a resident vehicle subsystem to execute a remediating action configured to prevent or mitigate activation of the invalid SIR module.

Clause 15: a motor vehicle, comprising: a vehicle body including a passenger cabin; a plurality of road wheels attached to the vehicle body; a prime mover attached to the vehicle body and configured to drive one or more of the road wheels to thereby propel the motor vehicle; a supplemental inflatable restraint (SIR) module mounted in the passenger cabin; a near-field communication (NFC) transceiver mounted to the vehicle body; and a vehicle controller mounted to the vehicle body and programmed to: detect, using the NFC transceiver, installation of the SIR module in the passenger cabin, the NFC transceiver pairing with an NFC tag mounted to the SIR module responsive to detecting installation of the SIR module; retrieve, through the NFC transceiver from the paired NFC tag, unique SIR module data specific to the SIR module; determine if the SIR module is invalid by comparing the unique SIR module data to host vehicle SIR data specific to the motor vehicle; and responsive to determining the SIR module is invalid, command a resident vehicle subsystem to execute a remediating action configured to prevent or mitigate activation of the invalid SIR module.

Clause 16: the motor vehicle of clause 15, wherein detecting the installation of the SIR module includes the NFC transceiver broadcasting a short-range electromagnetic field to the NFC tag, and the NFC tag powering on in response to receipt of the short-range electromagnetic field.

Clause 17: the motor vehicle of clause 16, wherein paring the NFC transceiver with the NFC tag includes establishing a secure device-to-device communication channel across the short-range electromagnetic field between the NFC tag and the NFC transceiver.

Clause 18: the motor vehicle of clause 15, wherein the resident vehicle subsystem includes a sensing and diagnostics module (SDM) operable to control activation of the SIR module, the vehicle controller being further programmed to command the SDM to enable activation of the SIR module responsive to determining the SIR module is not invalid.

Clause 19: the motor vehicle of clause 15, wherein the resident vehicle subsystem includes a sensing and diagnostics module (SDM) operable to control activation of the SIR module, and the remediating action includes the SIR module disabling activation of the SIR module.

Clause 20: the motor vehicle of clause 15, wherein the vehicle controller is further programmed to retrieve the host vehicle SIR data from a resident memory device of the host vehicle, wherein the vehicle controller determines whether or not the SIR module is invalid.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
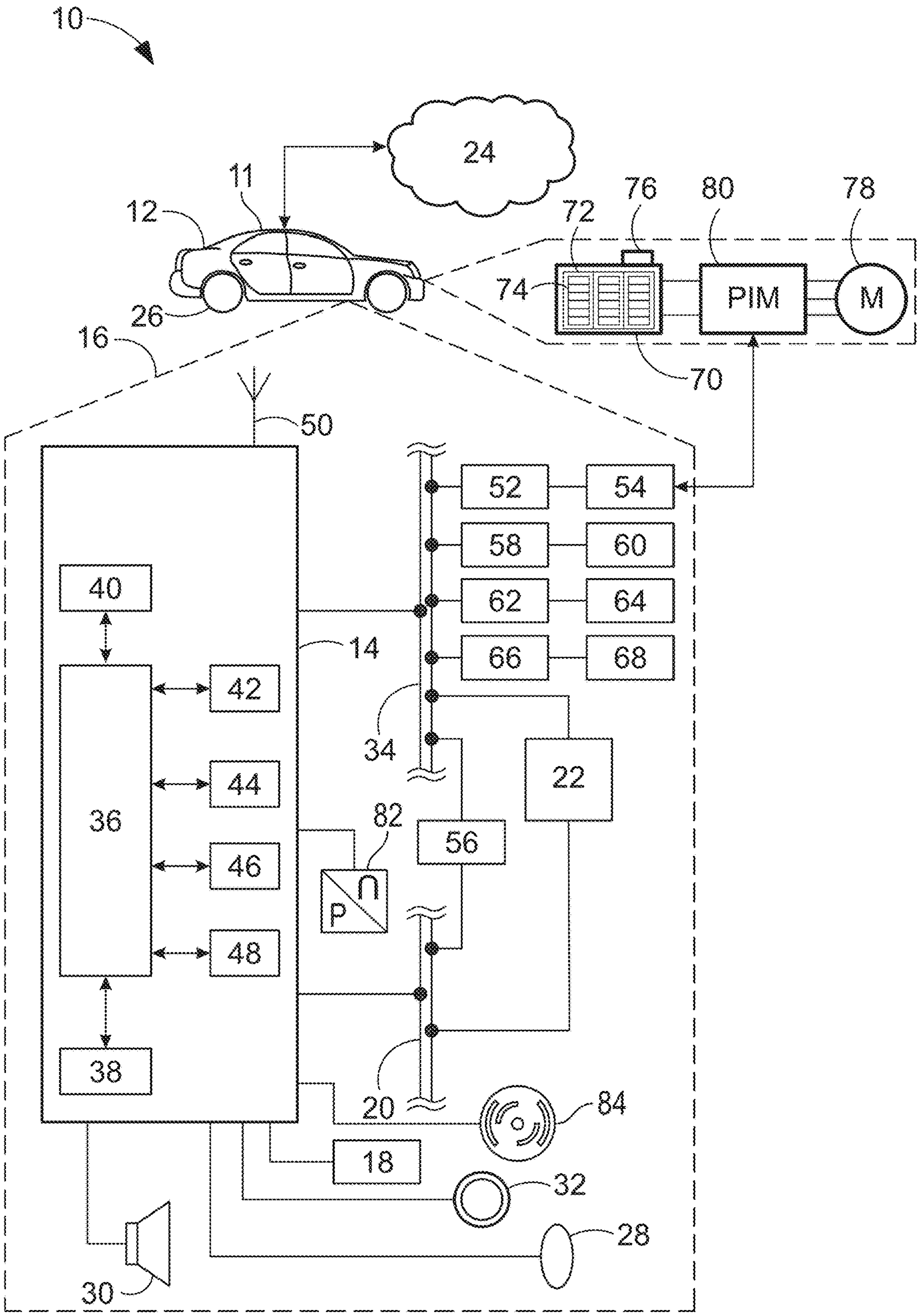
FIG. 1 is a partially schematic, side-view illustration of a representative motor vehicle with a network of in-vehicle controllers, sensors, and communication devices for provisioning invalid supplemental inflatable restraint (SIR) monitoring in accord with aspects of the present disclosure.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, Brief Description of the Drawings, and Detailed Description sections, but not explicitly set forth in the claims, should not be incorporated into the claims, singly or collectively, by implication, inference or otherwise. Moreover, recitation of "first", "second", "third", etc., in the specification or claims is not per se used to establish a serial or numerical limitation; unless specifically stated otherwise, these designations may be used for ease of reference to similar features in the specification and drawings and to demarcate between similar elements in the claims.

For purposes of this disclosure, unless specifically disclaimed: the singular includes the plural and vice versa (e.g., indefinite articles "a" and "an" should generally be construed as meaning "one or more"); the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein to denote "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which aspects of this disclosure may be practiced. In the same vein, utilization of the present concepts for detecting and confirming the authenticity of a driver supplemental inflatable restraint (DSIR) unit should also be appreciated as a non-limiting implementation of disclosed features. As such, it will be understood that aspects of this disclosure may be employed for monitoring other in-vehicle SIR units and may be utilized for any logically relevant type of motor vehicle. Moreover, only select components of the motor vehicle and the vehicle SIR module are shown and described in detail herein. Nevertheless, the vehicles and SIR modules discussed below may include numerous additional and alternative features, and other available peripheral hardware, for carrying out the various methods and functions of this disclosure.

The representative vehicle 10 of FIG. 1 is originally equipped with a vehicle telecommunications and information ("telematics") unit 14 that wirelessly communicates, e.g., via cellular network, satellite service, wireless-enabled modem, etc., with a remotely located cloud computing host service 24 (e.g., ONSTAR®). Some of the other vehicle hardware components 16 shown generally in FIG. 1 include, as non-limiting examples, an electronic video display device 18, a microphone 28, audio speaker(s) 30, and assorted user input controls 32 (e.g., buttons, knobs, switches, touchpads, touchscreens, etc.). These hardware components 16 function, in part, as a human/machine interface (HMI) that enables a user to communicate with the telematics unit 14 and other components resident to and remote from the vehicle 10. Microphone 28, for instance, provides occupants with a means to input verbal commands; the vehicle 10 may be equipped with an embedded voice-processing unit utilizing audio filtering, editing, and analysis modules. Conversely, the speaker 30 provides audible output to a vehicle occupant and may be either a stand-alone speaker dedicated of the telematics unit 14 or may be part of an in-cabin audio system 22. The audio system 22 is connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switches, parallel/serial communications buses, local area network (LAN) interfaces, controller area network (CAN) interfaces, and the like. The network connection interface 34 enables the vehicle hardware 16 to send and receive signals with one another and with various systems both onboard and off-board the vehicle body 12. This allows the vehicle 10 to perform assorted vehicle functions, such as modulating powertrain output, activating friction and regenerative brake systems, controlling vehicle steering, and other automated functions. For instance, telematics unit 14 may exchange signals with a Powertrain Control Module (PCM) 52, an Advanced Driver Assistance System (ADAS) module 54, a Motor Control Module (MCM) 56, a Sensing and Diagnostics Module (SDM) 58, a Sensor System Interface Module (SSIM) 60, and assorted other vehicle ECUs, such as a Transmission Control Module (TCM), a Body Control Module (BCM), a Brake System Control Module (BSCM), etc.

With continuing reference to FIG. 1, telematics unit 14 is an onboard computing device that provides a mixture of services, both individually and through its communication with other networked devices. This telematics unit 14 may be generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, solid-state drive (SSD) memory, hard-disk drive (HDD) memory, phase-change memory, flash memory, semiconductor memory (e.g., various types of RAM or ROM), etc.

Long-range communication (LRC) capabilities with remote, off-board devices may be provided via one or more or all of a cellular chipset/component, a navigation and location chipset/component (e.g., global positioning system (GPS) transceiver), a wireless modem, or a mobile hotspot, all of which are collectively represented at 44. Close-range wireless connectivity may be provided via a short-range communication (SRC) device 46 (e.g., a BLUETOOTH® unit or near field communications (NFC) transceiver), a dedicated short-range communications (DSRC) component 48, and/or a dual antenna 50. The communications devices described above may provision data exchanges as part of a periodic broadcast in a vehicle-to-vehicle (V2V) communication system or a vehicle-to-everything (V2X) communication system, e.g., Vehicle-to-Infrastructure (V2I), Vehicle-to-Pedestrian (V2P), Vehicle-to-Device (V2D), Vehicle-to-Cloud (V2C), etc.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, for executing a controller-automated (AV/ADAS) driving operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of in-vehicle sensors may be adapted, singly or collectively, to a given vehicle platform for achieving a desired level of automated vehicle operation.

To propel the automobile 10, a vehicle powertrain is operable to generate and deliver tractive torque to one or more of the vehicle's drive wheels 26. The powertrain is represented in FIG. 1 by an electric traction motor (M) 78 that is operatively connected to a rechargeable energy storage system (RESS), which may be in the nature of a chassis-mounted traction battery pack 70. The traction battery pack 70 is generally composed of one or more battery modules 72 each containing a cluster of battery cells 74, such as lithium-class, zinc-class, nickel-class, or organosilicon-class cells of the pouch, prismatic, or cylindrical type. One or more prime movers, such as traction motor/generator (M) units 78, draw electrical power from and, optionally, deliver electrical power to the battery pack 70. A power inverter module (PIM) 80 electrically connects the battery pack 70 to the motor(s) 78 and modulates the transfer of electrical current therebetween. The battery pack 70 may include an integrated electronics package, such as a wireless-enabled cell monitoring unit (CMU) 76, that enables on-module management, cell sensing, etc.

Figure 2:
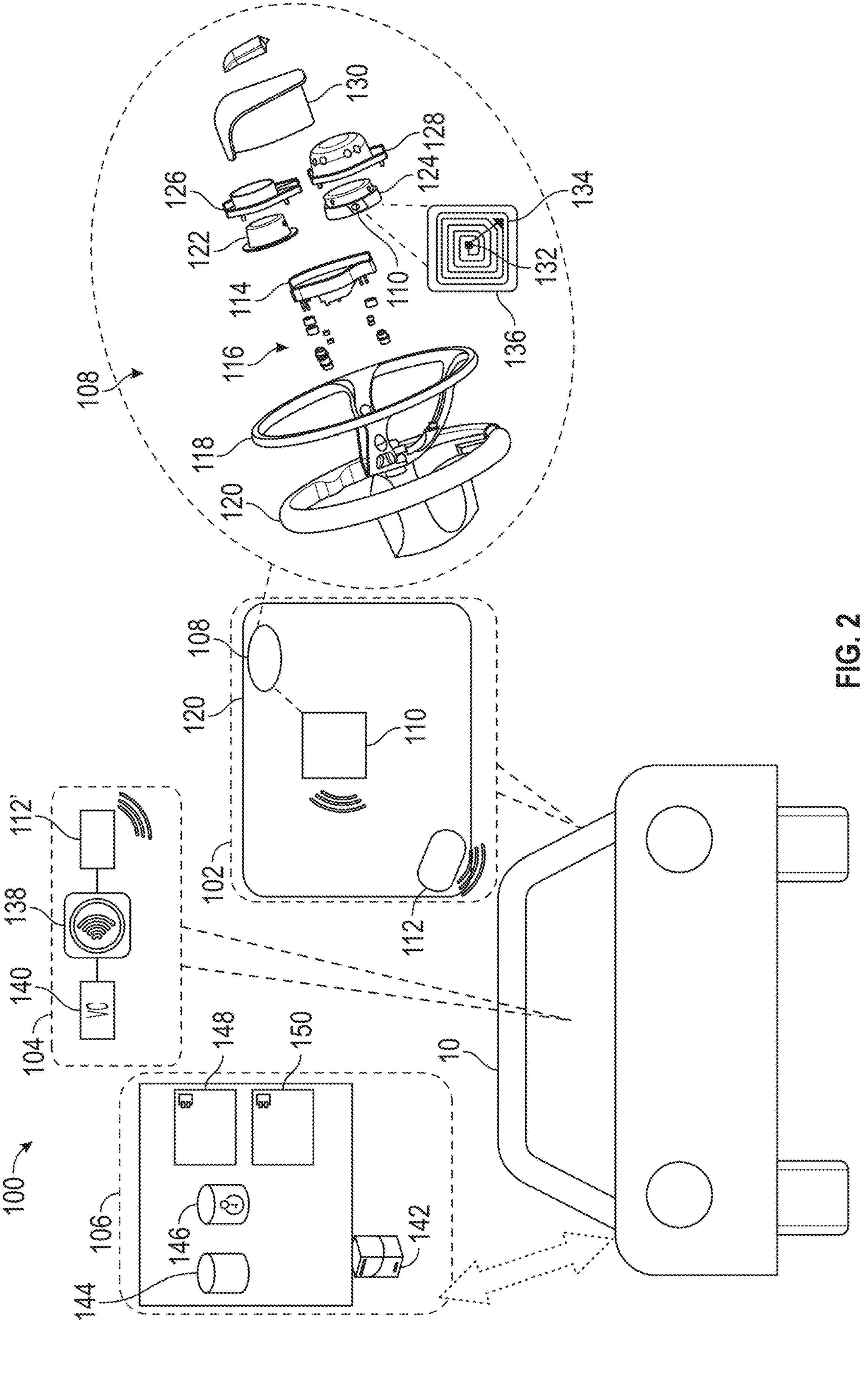
FIG. 2 is a diagrammatic illustration of the representative motor vehicle of FIG. 1 with an NFC-enabled invalid airbag detection and mitigation system in accord with aspects of the disclosed concepts.

FIG. 2 presents an example of an NFC-enabled invalid airbag detection and mitigation (CADM) system 100 for identifying an invalid SIR module that has been installed into the subject (host) motor vehicle 10 and automating ameliorative action to preclude or allay activation of the invalid SIR module. The CADM system 100 of FIG. 2 may be delineated into three interoperable subsystems: a wireless-enabled SIR module ID unit 102, a wireless-enabled SIR detection unit 104, and a cloud-based BO vehicle services provider 106. It should be appreciated that the vehicle CADM system 100 may include greater or fewer control segments than that which are shown, including segregating or eliminating one or more of the illustrated segments 102, 104, 106. For instance, vehicle communication with the BO vehicle services provider 106 may be optional, e.g., for multifactor (MFA) SIR authentication; consequently, single-factor authentication (SFA) architectures may altogether eliminate the BO vehicle services provider 106. It should also be appreciated that the SIR module ID unit 102 may be integrated into a DSIR unit 108 (as shown) or may be incorporated into other in-vehicle SIR units, including front passenger airbags, rear airbags, side-impact airbags, side curtain airbags, knee bolster airbags, etc.

SIR module ID unit 102 of FIG. 2 may be typified by an NFC tag 110 (e.g., NTAG215 Type 1 or 2 NFC tag) that is securely fixed to the DSIR unit 108, and an optional wireless signal repeater 112 that may be incorporated into the DSIR unit 108 (as indicated at 112) or into the host vehicle 10 (as indicated at 112'). As shown in the inset view of FIG. 2, the DSIR unit 108 includes a protective module housing 114 that mounts, e.g., via fasteners 116, to the central hub of an internal steering wheel frame 118 of a vehicle steering wheel assembly 120. A pyrotechnic airbag inflator canister 122 is nested inside of a complementary inflator cap 124, both of which are packaged within a clamshell-style inflator diffuser assembly composed of a diffuser bracket 126 and a diffuser cover 128. Once assembled, the diffuser bracket 126 and cover 128 mount the inflator canister 122 and cap 124 to the SIR module housing 114. The DSIR unit 108 is concealed behind a steering wheel fascia cover 130 such that a folded airbag cushion (not shown) is sandwiched between the inflator diffuser assembly 126, 128 and cover 130.

To prevent tampering or illicit removal, the NFC tag 110 of FIG. 2 may be mounted inside the SIR module housing 114, e.g., affixed via pressure-sensitive adhesive (PSA) directly onto the inflator cap 124 of the airbag inflator assembly. Alternatively, the NFC tag 110 may be secured to other locations within the DSIR unit 108, such as the module housing 114, diffuser bracket 126, or diffuser cover 128, without departing from the intended scope of this disclosure. It may also be desirable to manufacture the NFC tag 110 with a passive-type integrated circuit NFC chip 132 and an EMF-type NFC antenna 134 that are secured onto a flexible NFC substrate 136. The NFC substrate 136 may be fabricated from a material, such as liquid crystal polymer (LCPs) or paper, that incinerates at a burn temperature which is comparable to that of the heat generated by the airbag inflator canister 122 (e.g., 350-400 degrees). The NFC tag 110 may be original equipment that is installed on the airbag inflator by the manufacturer of the DSIR unit 108 or may be installed by the OEM itself or as after-market equipment by an authorized vendor.

With continuing reference to FIG. 2, the SIR detection unit 104 may be typified by an NFC transceiver 138 (e.g., NFC ISO 14443-A or B reader) and a resident vehicle controller (VC) 140 (e.g., CPU 36 and/or SDM 58 of FIG. 1) that are securely affixed to the host vehicle 10 and cooperatively configured to authenticate one or more of the in-vehicle SIR modules. The resident VC 140 may wirelessly communicate—through the NFC transceiver 138 and, if present, the wireless signal repeater 112'—with the SIR-mounted NFC tag 110 to retrieve therefrom module-specific data that is unique to the DSIR unit 108 (e.g., serial number, part number, make and model, etc.). This unique SIR module data may be used by the resident VC 140 and/or a BO server-class computer terminal 142 to ascertain whether or not the DSIR 108 is valid (e.g., authentic and assigned to the host vehicle 10). Wireless communication between the host vehicle 10 and the BO vehicle services provider 106 may enable two-step SIR authentication confirmation, tracking and recording of vehicle VIN history, and may also enable the BO's server-class computer terminal 142 to interface with the host vehicle's SDM 58 to enable remote deactivation or customization of the inflator assembly's firing loop.

If the DSIR 108 is determined to be valid, the SDM 58 may enable activation of the DSIR unit 108 while the resident VC 140 concomitantly transmits notification of the SIR's validity to the BO vehicle services provider 106. During vehicle use, an AIRBAG ACTIVE icon may be illuminated on the host vehicle's digital instrument panel (IP). Conversely, if determined to be invalid, the vehicle CPU 36 may set a system fault flag in resident cache memory, the SDM 58 may deactivate the firing loop for the airbag inflator canister 122, and the resident VC 140 may concomitantly transmit notification of the SIR's invalidity to the BO vehicle services provider 106. When the host vehicle 10 is in operation, the centerstack telematics unit 14 or digital IP may issue an audible or visible alert to warn the vehicle driver or owner that a faulty (invalid) SIR needs servicing.

BO vehicle services provider 106 of FIG. 2 may be a cloud-base platform (e.g., cloud host service 24) that tracks and authenticates installed airbag modules by cross-referencing their respective NFC tag-embedded SIR module data with the host vehicle's unique Vehicle Identification Number (VIN) and associated SIR data. This segment of the CADM system 100 may also watch for any manufacturer-issued airbag recalls, monitor SIR activation, and track authentication of SIR ID migration when a SIR module is replaced. The illustrated BO vehicle services provider 106 contains a server-class computer station 142 that interfaces with a vehicle OEM server system that maintains a vehicle owner database 144, an airbag ID, key & certificate (IKC) database 146, a user management application program interface (API) 148, and a key sharing API 150. BO vehicle services provider 106, in cooperation with the SIR module ID unit 102 and SIR detection unit 104, may help to prevent installation of non-OEM replica airbag modules that may not function as designed by the OEM and may harm an occupant when activated. The CADM system 100 may also automate alerts to warn dealerships and owners of an unapproved airbag system installed in their vehicle. Since each airbag module may be individually tagged and traced, this solution may also help to discourage airbag theft.

The vehicle owner database 144 may maintain digital records for each host vehicle, including their individualized vehicle information (e.g., make, model, trim, year, VIN, etc.) and vehicle-specific SIR data unique to that host vehicle (e.g., list of all airbag modules, packaging locations, manufacturers, serial numbers, part numbers, models, etc.). Comparatively, airbag IKC database 146 may maintain records of airbag ID information, SDM ID information, and other airbag components that may be tracked with NFC tags (e.g., seatbelt pretensioners, occupant detection sensors, etc.). The airbag IKC database 146 may also track OEM airbags that are in-dealership as service parts that are yet to be installed, e.g., to help track SIR replacement activities and update host vehicle data with a new airbag in its associated VIN vehicle history. The key sharing API 150 may function as a software interface that enables the host vehicle 10, dealerships, and repair shops to connect to and perform data exchanges with the databases 144 and 146 of the repository information of qualified OEM-verified airbag modules and associated vehicle VIN information. The key sharing API 150 may also enable authorized parties to find specific SIR modules that may be subject to a recall.

Figure 3:
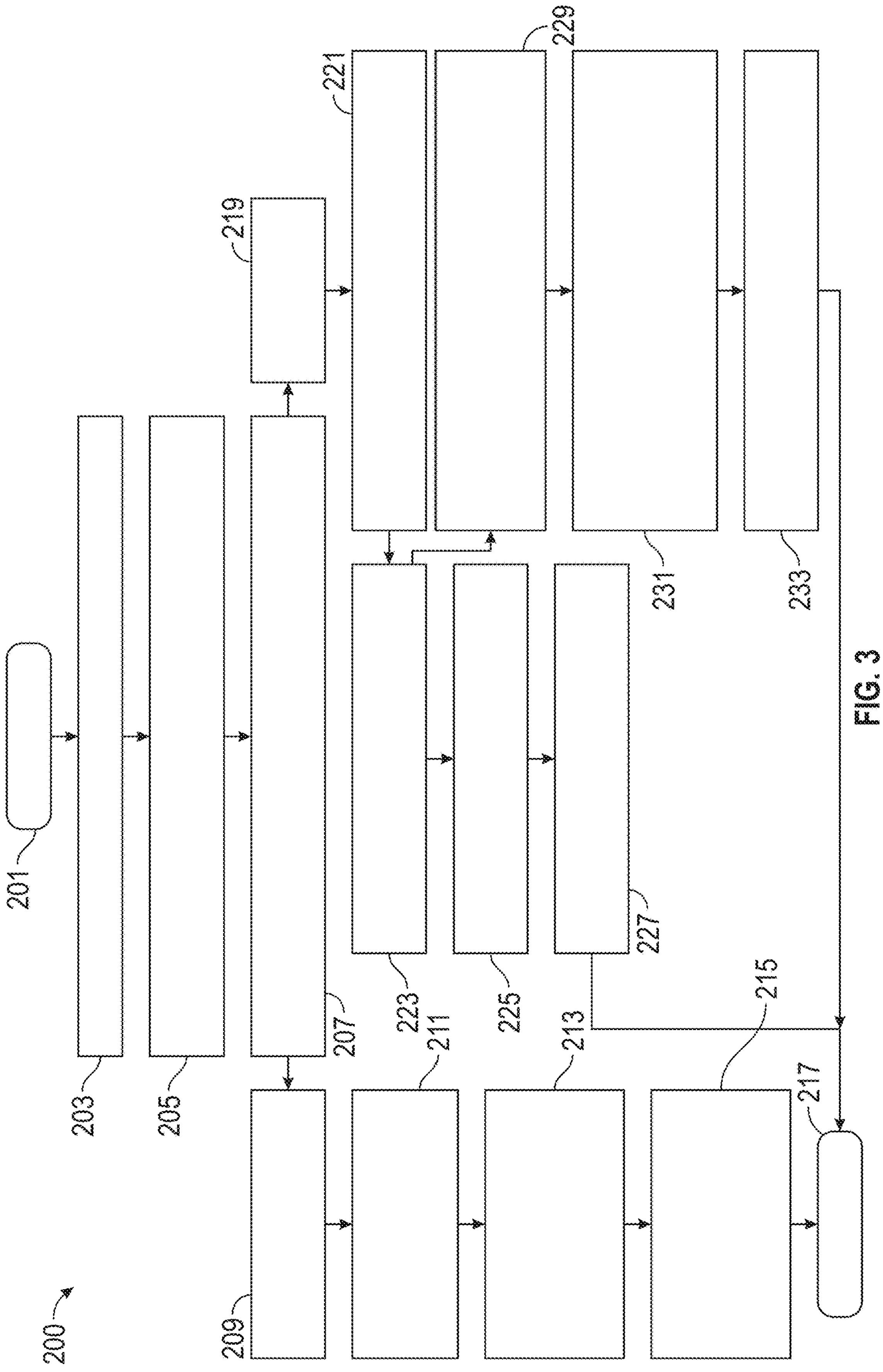
FIG. 3 is a flowchart illustrating a representative host vehicle control protocol for providing invalid airbag detection and mitigation, which may correspond to non-transient, memory-stored instructions that are executable by a resident or remote microprocessor, control module, programmable logic circuit, central controller, or other integrated circuit (IC) device or network of controllers/processors/modules/devices/etc. in accordance with aspects of the disclosed concepts.

With reference next to the flowchart of FIG. 3, an improved method or control protocol for operating a valid airbag detection and authentication system of a motor vehicle, such as automobile 10 of FIGS. 1 and 2, is generally described at 200 in accordance with aspects of the present disclosure. Some or all of the operations illustrated in FIG. 3 and described in detail below may be representative of an algorithm that corresponds to non-transitory, processor-executable instructions that may be stored, for example, in main or auxiliary or remote memory (e.g., resident vehicle memory 38 and/or remote cloud host service 24 database of FIG. 1). These instructions may be executed, for example, by a microprocessor, central controller, dedicated control module, programmable logic circuit, or other module or device or network of controllers/modules/devices (e.g., vehicle CPU 36 of FIG. 1 and/or BO server-class computer terminal 142 of FIG. 2) to perform any or all of the above and below described functions associated with the disclosed concepts. It should be recognized that the order of execution of the illustrated operation blocks may be changed, additional operation blocks may be added, and some of the herein described operations may be modified, combined, or eliminated.

Method 200 may begin at START terminal block 201 of FIG. 3 with memory-stored, computer-readable instructions for initializing an airbag validity verification control protocol for a host vehicle. This routine may be initialized in real-time, near real-time, continuously, systematically, sporadically, and/or at predefined time intervals, for example, each 10 or 100 milliseconds during operation of the motor vehicle 10. As yet another option, terminal block 201 may initialize responsive to a user command prompt (e.g., via telematics input controls 28, 32), a resident vehicle controller prompt (e.g., from CPU 36), or a broadcast prompt signal received from a centralized BO vehicle services system (e.g., from cloud host service 24). In one example, method 200 may automatically initialize as part of a systems diagnostics check by the SDM 58 during key-on of the host vehicle 10. Upon completion of some or all of the control operations presented in FIG. 3, method 200 may advance to END terminal block 217 and temporarily terminate or, optionally, may loop back to terminal block 201 and run in a continuous loop (e.g., until all installed airbags have been evaluated or until key-off of the host vehicle).

From terminal block 201, method 200 may advance to AIRBAG DETECTION process block 203 to detect the presence of a new or replacement SIR module in the passenger cabin 11 of the host vehicle 10. Detecting the presence of a newly installed SIR module, for example, may include an in-vehicle NFC reader (e.g., host NFC transceiver 138 of FIG. 2) broadcasting a short-range, low-power electromagnetic field (EMF) within the vehicle's passenger cabin 11. Once in range of the NFC reader, an NFC tag attached to the SIR module (e.g., inflator-mounted NFT tag 110 of FIG. 2) receives and is powered on by the electromagnetic field via EMF induction, which activates its microchip (e.g., NFC chip 132). Upon detection of the SIR module, method 200 may responsively pair the in-vehicle NFC reader with the NFC tag attached to the SIR module. Pairing the in-vehicle NFC reader with the SIR-mounted NFC tag may include the NFC tag's microchip outputting a handshake request to the NFC transceiver and, if approved, establishing a secure device-to-device communication channel across the electromagnetic field between the NFC tag and NFC transceiver.

After detecting the presence of a SIR module, method 200 may responsively execute STEP-1 SIR AUTHENTICATION subroutine 205 to determine whether or not the SIR module is valid. Airbag authentication may include cross-referencing unique NFC tag-embedded SIR data with resident memory-stored SDM ID data; if the two data sets coincide, the NFC tag data and, thus, the SIR module may be registered with the host vehicle. For instance, the resident VC 140 of host vehicle 10 of FIG. 2 may access the paired NFC tag 110 through the in-cabin NFC transceiver 138 and retrieve the SIR modules'unique SIR ID data. Once retrieved, the SIR module's unique SIR ID data is compared to host vehicle's unique vehicle/SIR data; if the NFC tag-stored SIR ID data matches the host vehicle-stored vehicle/SIR data, the SIR module may be deemed valid.

Upon confirming that the evaluated SIR module is valid, method 200 may responsively execute STEP-2 SIR AUTHENTICATION subroutine 207 to corroborate with an OEM database that the SIR is in fact valid. Referring again to the example presented in FIG. 2, the resident VC 140 communicates (e.g., via LRC component(s) 44 of FIG. 1) with the BO vehicle services provider 106 to transmit thereto an electronic data package with the tentatively validated SIR module's unique SIR ID. Upon receipt of this data, the BO server-class computer terminal 142 accesses the owner database 144 to call-up the host vehicle's digital records, including its respective vehicle information and assigned vehicle SIR data. Computer terminal 142 concomitantly cross-references the SIR module's unique SIR ID data to the database-stored unique vehicle/SIR data of the host vehicle to see if they match. If the BO vehicle services provider 106 confirms the validity of the subject SIR module, the BO server-class computer terminal 142 may register the SIR ID data with the host vehicle's VIN ID record in the owner database 144. At the same time, the BO vehicle services provider 106 may wirelessly transmit a notification to the host vehicle 10 that the evaluated SIR module has been verified as valid. Antithetically, the BO vehicle services provider 106 may respond to concluding that the subject SIR module is invalid by appending a fault flag to the host vehicle's VIN ID record in the owner database 144, and concurrently transmitting an alert notification to the host vehicle that the evaluated SIR module has been deemed invalid.

After validating the host vehicle's in-cabin SIR module (s), method 200 may receive notification of a vehicle "field service action," which may be in the nature of an airbag recall (service, removal, or replacement) campaign, as indicated at FIELD ACTION EVENT data input block 209. By way of example, and not limitation, BO vehicle services provider 106 of FIG. 2 may receive notification from the manufacturer of the DSIR unit 108 that there is an airbag sensor defect (e.g., faulty seat occupant sensor 82). Method 200 may thereafter responsively execute FIELD ACTION ALERT data output block 211, e.g., whereat the BO vehicle services provider 106 may broadcast a recall alert to all affected vehicles, including host vehicle 10. In tandem with this transmission, method 200 may execute AIRBAG DEACTIVATION process block 213 to deactivate airbag deployment of each recalled SIR module until the field action is resolved. Continuing with the above example, a hardware device driver may be embedded within the broadcast recall alert; when received and executed by the host vehicle 10, the device driver may cause the resident VC 140 to set a diagnostics fault flag and command the SDM 58 to disable activation of the DSIR unit 108. When the host vehicle 10 receives notification that the SIR module recall has been resolved at FIELD ACTION COMPLETE data input block 215, the diagnostics fault flag may be removed, activation of the DSIR unit 108 may be re-enabled, and the SIR modules'unique SIR ID data may be updated in the owner database 144. Method 200 may thereafter temporarily end at terminal block 217 or may loop back to process block 203, 209 or 219.

After validating the host vehicle's in-cabin SIR module (s), one or more of the airbags may be deployed at AIRBAG ACTIVATION subroutine 219 of FIG. 3. Upon detecting the onset of an airbag triggering event, for example, vehicle dynamics sensors 68 may transmit sensor signals indicative of the triggering event to SDM 58 via SSIM 60. The SDM 58 may immediately react to notification of the triggering event by initiating a firing loop for the pyrotechnic airbag inflator canister 122 of the DSIR unit 108. After deployment of one or more of the vehicle airbags, the host vehicle 10 may wirelessly transmit a notification of SIR module activation to the BO vehicle services provider 106 at AIRBAG ACTIVATION ALERT data output block 221. BO server-class computer terminal 142 may update the host vehicle's unique vehicle/SIR data in vehicle owner database 144 to reflect SIR module activation and need for replacement.

Advancing to AIRBAG REPLACEMENT process block 223, the host vehicle may be brought into an automobile repair shop or an OEM-certified dealership for repair and the deployed vehicle airbag(s) are replaced. After repair and replacement, method 200 may concurrently execute the AIRBAG DETECTION and AUTHENTICATION procedures described above with respect to process blocks 203 and 205 to assess the validity of each newly installed SIR module. The resident VC 140 of the host vehicle 10 of FIG. 2, for example, may cross-reference the unique NFC tag-embedded SIR data of a newly installed SIR module with the resident memory-stored SDM ID data to determine if the two data sets coincide. If they do, the new module may be deemed valid at VALID SIR REPLACEMENT process block 225 and the SIR module's unique SIR ID data may be registered with the host vehicle's locally stored SDM ID data. Alternatively, the spent SIR module may be replaced with an OEM-certified SIR module; the dealership/repair shop may update the locally stored SDM ID data to reflect the unique SIR data of a newly installed SIR module. In tandem, method 200 may execute VALID SIR ALERT data output block 227 of FIG. 3 and the host vehicle 10 or the repair shop/dealership may transmit an electronic notification to the BO vehicle services provider 106 with an indication that the deployed airbag module(s) have been repaired and the replacement module(s) are valid; owner database 144 may be updated accordingly.

After repair and replacement of a deployed airbag, the host vehicle's resident VC 140 may determine that the unique NFC tag-embedded SIR data of the newly installed SIR module does not match the resident memory-stored SDM ID data and/or is not listed within the airbag IKC database 146 as an OEM-certified replacement SIR module. If the replacement module's unique SIR module data does not match or is not registered as pre-certified, the new module may be designated as invalid at INVALID SIR REPLACEMENT process block 229. In this instance, the SIR module's unique SIR ID data may be flagged as bogus and is not registered with the host vehicle's locally stored SDM ID data. At that time, method 200 may execute INVALID SIR ALERT data output block 231 of FIG. 3 and the host vehicle 10 or the repair shop/dealership may transmit an electronic notification to the BO vehicle services provider 106 with an indication that the replacement module (s) are invalid and the deployed airbag module(s) still need to be repaired. An email notification may be sent to the vehicle owner and/or a visual/audible alert may be output to the vehicle driver alerting them to the invalid airbag. In addition, the SDM 58 may disable activation of the invalid module(s) and may limit maximum vehicle driving speeds until the issue is rectified. At CERTIFIED SIR REPLACEMENT process block 233, the host vehicle may be repaired and the deployed SIR module(s) replaced with OEM-approved airbag modules each with a respective module-mounted NFC tag.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol, or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of operating a host vehicle with a host vehicle body defining therein a passenger cabin, the method comprising:

detecting, via a near-field communication (NFC) transceiver attached to the host vehicle body, installation of a supplemental inflatable restraint (SIR) module in the passenger cabin;

pairing, responsive to detecting installation of the SIR module, the NFC transceiver with an NFC tag mounted to an airbag inflator assembly inside a protective module housing of the SIR module, the NFC tag including an NFC chip and an electromagnetic field (EMF) antenna mounted on an NFC substrate configured to incinerate at a temperature of heat generated by the airbag inflator assembly when activated;

retrieving, through the NFC transceiver from the paired NFC tag via a vehicle controller attached to the host vehicle body, unique SIR module data specific to the SIR module;

determining if the SIR module is invalid by comparing the unique SIR module data to host vehicle SIR data specific to the host vehicle;

commanding, via the vehicle controller responsive to determining the SIR module is invalid, a resident vehicle subsystem to execute a remediating action configured to prevent or mitigate activation of the invalid SIR module; and activating, after determining the SIR module is not invalid, the airbag inflator assembly to thereby incinerate the NFC tag.

2. The method of claim 1, further comprising:

receiving, via the vehicle controller, a deployment notification indicating the SIR module was activated;

detecting, via the NFC transceiver after receipt of the deployment notification, installation of a replacement SIR module in the passenger cabin; and pairing, responsive to detecting installation of the replacement SIR module, the NFC transceiver with a new NFC tag mounted to the replacement SIR module.

3. The method of claim 2, further comprising:

retrieving, via the vehicle controller through the NFC transceiver, new unique SIR module data specific to the replacement SIR module;

determining if the replacement SIR module is invalid by comparing the new unique SIR module data to the host vehicle SIR data specific to the host vehicle; and commanding, via the vehicle controller responsive to determining the replacement SIR module is invalid, the resident vehicle subsystem to execute the remediating action to prevent or mitigate activation of the invalid replacement SIR module.

4. The method of claim 1, wherein detecting the installation of the SIR module includes the NFC transceiver broadcasting a short-range electromagnetic field to the NFC tag, and the NFC tag powering on in response to receipt of the short-range electromagnetic field.

5. The method of claim 4, wherein pairing the NFC transceiver with the NFC tag includes establishing a secure device-to-device communication channel across the short-range electromagnetic field between the NFC tag and the NFC transceiver.

6. The method of claim 1, wherein the resident vehicle subsystem includes a sensing and diagnostics module (SDM) operable to control activation of the SIR module, the method further comprising commanding, via the vehicle controller responsive to determining the SIR module is not invalid, the SDM to enable activation of the SIR module.

7. The method of claim 1, further comprising transmitting, via the vehicle controller, the unique SIR module data to a back-office (BO) vehicle services provider, wherein determining the SIR module is invalid includes the BO vehicle services provider retrieving the host vehicle SIR data from a SIR ID database, comparing the unique SIR module data to the host vehicle SIR data, and wirelessly transmitting an invalid SIR module alert to the vehicle controller.

8. The method of claim 1, further comprising retrieving, via the vehicle controller, the host vehicle SIR data from a resident memory device of the host vehicle, wherein the vehicle controller determines whether or not the SIR module is invalid.

9. The method of claim 1, wherein the resident vehicle subsystem includes a sensing and diagnostics module (SDM) operable to control activation of the SIR module, and the remediating action includes the SDM disabling activation of the SIR module.

10. The method of claim 1, wherein the resident vehicle subsystem includes a powertrain control module (PCM) operable to control a powertrain of the host vehicle, and the remediating action includes the PCM reducing a maximum allowable speed of the host vehicle.

11. The method of claim 1, wherein the resident vehicle subsystem includes an infotainment system with a telematics unit and/or a digital instrument cluster mounted inside the passenger cabin, and the remediating action includes the infotainment system outputting a predefined audible and/or visual alert of an invalid SIR module to an occupant of the host vehicle.

12. A non-transitory, computer-readable medium storing instructions executable by a vehicle controller of a host vehicle, the host vehicle including a host vehicle body, the instructions, when executed, causing the vehicle controller to perform operations comprising:

detecting, using a near-field communication (NFC) transceiver attached to the host vehicle body, installation of a supplemental inflatable restraint (SIR) module on the host vehicle, the NFC transceiver pairing with an NFC tag of the SIR module in response to detecting installation of the SIR module, the NFC tag mounted onto an airbag inflator assembly located inside a protective module housing of the SIR module, the NFC tag including an NFC chip mounted on an NFC substrate configured to incinerate at a temperature of heat generated by the airbag inflator assembly when activated;

retrieving, through the NFC transceiver from the paired NFC tag, unique SIR module data specific to the SIR module;

determining if the SIR module is invalid by comparing the unique SIR module data to host vehicle SIR data specific to the host vehicle;

commanding, via the vehicle controller responsive to determining the SIR module is invalid, a resident vehicle subsystem to execute a remediating action configured to prevent or mitigate activation of the invalid SIR module; and activating, after determining the SIR module is not invalid, the airbag inflator assembly to thereby incinerate the NFC tag.

13. A motor vehicle, comprising:

a vehicle body including a passenger cabin;

a plurality of road wheels attached to the vehicle body;

a prime mover attached to the vehicle body and configured to drive one or more of the road wheels to thereby propel the motor vehicle;

a supplemental inflatable restraint (SIR) module mounted in the passenger cabin, the SIR module including an NFC tag mounted to an airbag inflator assembly located inside a protective SIR module housing, the NFC tag including an NFC chip and an electromagnetic field (EMF) antenna mounted on an NFC substrate configured to incinerate at a temperature of heat generated by the airbag inflator assembly when activated;

a near-field communication (NFC) transceiver mounted to the vehicle body; and a vehicle controller mounted to the vehicle body and programmed to:

detect, using the NFC transceiver, installation of the SIR module in the passenger cabin, the NFC transceiver pairing with the NFC tag mounted to the SIR module responsive to detecting installation of the SIR module;

retrieve, through the NFC transceiver from the paired NFC tag, unique SIR module data specific to the SIR module;

determine if the SIR module is invalid by comparing the unique SIR module data to host vehicle SIR data specific to the motor vehicle;

responsive to determining the SIR module is invalid, command a resident vehicle subsystem to execute a remediating action configured to prevent or mitigate activation of the invalid SIR module; and activate, after determining the SIR module is not invalid, the airbag inflator assembly to thereby incinerate the NFC tag.

14. The motor vehicle of claim 13, wherein detecting the installation of the SIR module includes the NFC transceiver broadcasting a short-range electromagnetic field to the NFC tag, and the NFC tag powering on in response to receipt of the short-range electromagnetic field.

15. The motor vehicle of claim 14, wherein pairing the NFC transceiver with the NFC tag includes establishing a secure device-to-device communication channel across the short-range electromagnetic field between the NFC tag and the NFC transceiver.

16. The motor vehicle of claim 13, wherein the resident vehicle subsystem includes a sensing and diagnostics module (SDM) operable to control activation of the SIR module, the vehicle controller being further programmed to command the SDM to enable activation of the SIR module responsive to determining the SIR module is not invalid.

17. The motor vehicle of claim 13, wherein the resident vehicle subsystem includes a sensing and diagnostics module (SDM) operable to control activation of the SIR module, and the remediating action includes the SDM disabling activation of the SIR module.

18. The motor vehicle of claim 13, wherein the vehicle controller is further programmed to retrieve the host vehicle SIR data from a resident memory device of the host vehicle, wherein the vehicle controller determines whether or not the SIR module is invalid.

19. The method of claim 1, wherein the NFC chip is a passive-type integrated circuit NFC chip, the method further comprising emitting, via the NFC transceiver, a short-range electromagnetic field (EMF) to thereby activate the NFC chip via the NFC antenna, and wherein detecting installation of the SIR module includes initializing a secure wireless communication connection between the NFC transceiver and the NFC tag.

20. The method of claim 19, wherein pairing the NFC transceiver with the NFC tag includes establishing a secure device-to-device communication channel across the short-range EMF between the NFC tag and the NFC transceiver.

* * * * *